Patented July 15, 1947

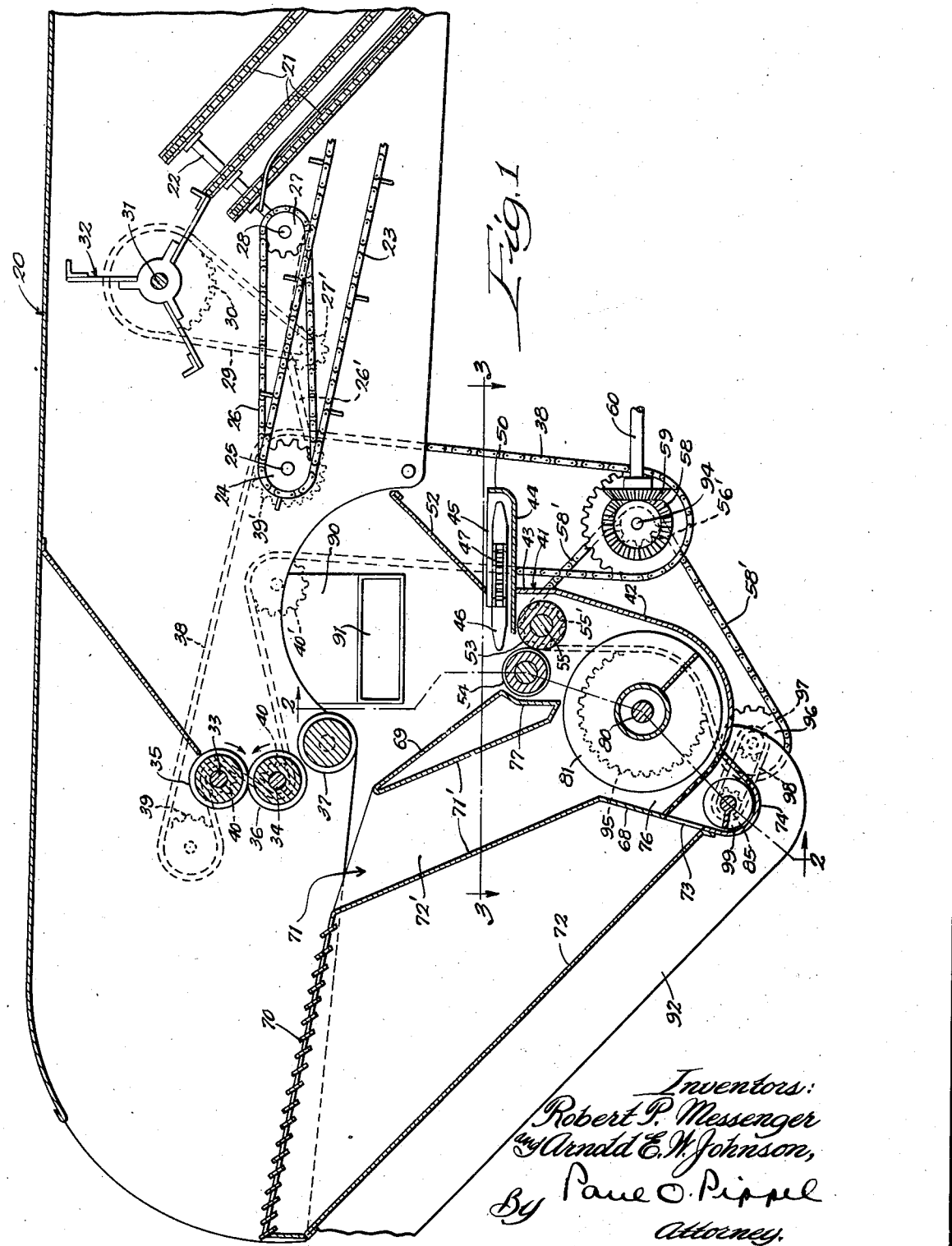

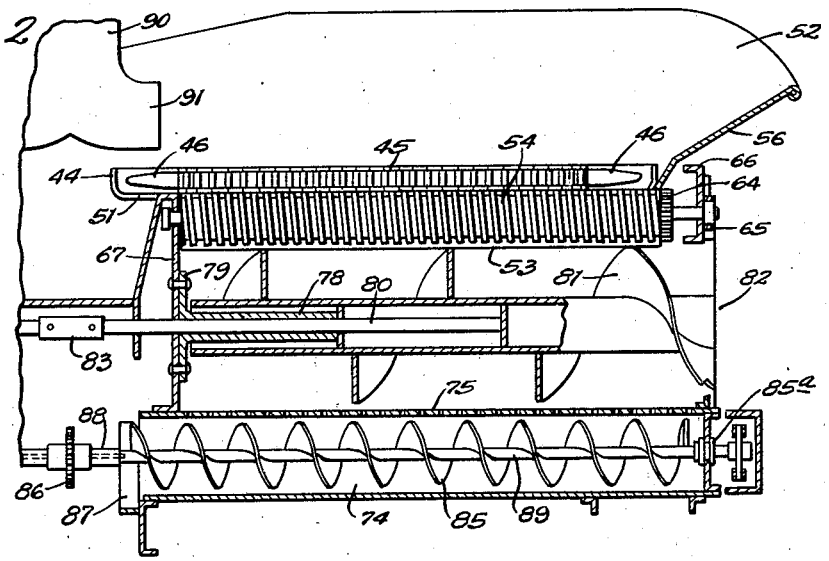

2,424,181

UNITED STATES PATENT OFFICE 2,424,181

CORN SNAPPING AND HUSKING DEVICE

Robert P. Messenger, Kenilworth, and Arnold E. W. Johnson, Oak Park, Ill., assignors to International Harvester Company, a corporation of New Jersey Application August 7, 1944, Serial No. 548,326

6 Claims. (Cl. 130—5)

This invention relates to a corn harvester. More specifically it relates to a husking mechanism particularly adaptable for a field type of self-propelled corn harvester.

The principal object of the present invention is to provide an improved husking device adapted to work in conjunction with a snapping device for removing ears from stalks.

A more specific object is to provide a snapping and husking device, including means for recovering shelled grain from stalks and husks passing through the snapping means.

Another subsidiary object is to collect loose husks passing through snapping means and to convey such husks along with husks from a husking means over a grain saving means.

The above objects and others, which will be apparent from the detailed description to follow, are accomplished by a construction such as illustrated in the drawings, in which:

Figure 1 is a vertical section through a combined snapping and husking device incorporating the invention;

Figure 2 is a vertical transverse section taken substantially on the line 2—2 of Figure 1; and, Figure 3 is a horizontal section taken substantially on the line 3—3 of Figure 1.

As illustrated, only the rear portion of a stalk conveying structure is shown, this invention having to do only with removing ears from the stalks and husking the ears. The copending application 537,719, filed May 27, 1944, shows an entire machine of the type which would be suitable for using a device incorporating the invention. A housing structure 20, extending substantially horizontally, supports the rear portion of stalk gathering and forwarding means. Stalks which have been severed from the ground are carried rearwardly by a plurality of chains 21 supported in position by sprockets on a shaft 22. The stalks are further carried rearwardly in a substantially horizontal position by a conveyor 23, which may be driven by a sprocket 24, mounted on a shaft 25. A chain 26 is also illustrated which may be a part of the drive for the gathering chains 21. Said chain, as illustrated, passes over a sprocket 27 carried by a shaft 28. Said shaft may drive the shaft 22 by conventional bevel gears or other suitable means. A second drive chain 26' is also indicated in dotted lines, said chain passing over a sprocket 27', which may form a part of the drive mechanism for a chain 29, illustrated as driving a sprocket 30 mounted on a shaft 31. A stalk forwarding structure 32, carried by the shaft 31, is mounted in a position over the conveyor 23 for assisting in forwarding stalks rearwardly into the snapping mechanism.

A pair of spaced shafts 33 and 34 carry, respectively, snapping rolls 35 and 36. Said rolls may be of any conventional type suitable for snapping ears from stalks passing therebetween. An idler roll 37, below the lower snapping roll 36, acts to deliver the ears downwardly when snapped from the stalks, at the same time preventing any clogging action. A drive chain 38 is illustrated in dotted lines as passing over an idler 39 and sprockets 40 on the snapping roll shafts 33 and 34. Said chain also passes over a sprocket 39' on the shaft 25 and over an idler 40'. The means for delivering driving power to said chain will be later described along with the power drive connections for the husking mechanism.

The husking unit is provided with a frame structure in the form of a sheet metal housing 41, extending transversely of the snapping mechanism. Said housing forms a basic structure for the entire assembly of elements making up the husking device. A wall 42, extending upwardly from a curved lower portion of the housing 41, joins with a vertical wall 43 terminating adjacent a horizontal table member 44. An ear forwarding chain 45, having ear engaging elements 46 thereon, operates above said table member 44. As shown in Figure 3, said chain operates on transversely spaced sprockets 47 and 48. Said sprockets are carried by vertical shafts 49, one of the shafts being supplied with power input means for driving the forwarding chains. An upstanding wall 50, around the table member 44, retains shelled grain and portions of ears which may be carried around by the forwarding chain, assuring that such recovered material is delivered at the central end 51 along with the husked ears. A deflector member 52 extends upwardly to form one side of a hopper for receiving ears snapped by rolls 40 and dropped downwardly therefrom.

Figures 2 and 3 indicate that there may be another husking unit symmetrical with respect to the unit described and extending in the other direction therefrom. Only one of the units is completely shown and references will be made only to this unit. A set of husking rolls consisting of a roll 53, lying adjacent the terminal edge of the table 44 and a roll 54 adjacent the roll 53 and on a somewhat higher level, extend transversely of the frame structure 41, being journaled thereon, some of the journals being shown in Figures 2 and 3. The roll 53 is carried by a shaft 55 extending through an end wall 56. The shaft 55 is journaled on a support 57 indicated in Figure 3. A sprocket 55', secured to the shaft 55 adjacent the support 57, engages a chain 58' which passes over a sprocket 56' to provide a source of power. The sprocket 56' is carried on a shaft 94 which also carries a bevel gear 58, meshing with a bevel gear 59, carried by a power input shaft 60. As shown in Figure 3, the shaft 60 is secured by a flexible coupling 61 to a power take-off shaft 62 which may be the rearwardly extending power take-off shaft of a tractor.

Meshing gears 63 and 64, on the ends of the husking roll shafts, outside the walls 56, provide for driving the roll 54 from the roll 53. As shown in Figure 3, the shaft of the roll 54 is journaled in a member 65, carried by a longitudinally extending channel-shaped member 66 which is a part of the frame structure of the husking roll. Figure 2 shows a vertically extending wall 67 in which the inner end of the shaft carrying the husking roll 54 is journaled. Said wall 67 extends downwardly, being connected to and forming a part of the housing structure 41 which has been previously described.

The curved bottom portion of the housing 41 extends rearwardly and upwardly, being connected to an upwardly extending wall 68. An angularly directed wall 69 extends from a point adjacent the husking roll 54 upwardly and rearwardly. A grid 70, spaced from the top of the wall 69, extends rearwardly to provide means for allowing shelled grain, carried rearwardly by the stalks, to be retained and saved. It will be noted that the rear end of the snapping unit housing 20 is opened to provide for the passage of stalks from which the ears have been snapped over the grid 70. A husk and shelled grain return chute 71 is provided at the rear of the snapping rolls 40, between the wall 69 and the beginning of the grid 70, by spaced angularly extending walls 71' and 72'. End walls 72', as best seen in Figure 3, connect the ends of the walls 71' and 72' to form a closed chute. Said chute at its lower end delivers directly into the curved lower portion of the housing structure 41. An inclined wall 72, extending between the end walls 72', forms a deflector for shelled grain dropping through the grid 70, delivering said grain through an opening 73 between the lower end of the wall 72 and the wall 68. A curved wall 74, which may be an extension of the wall 68, forms a grain saving compartment into which shelled grain is delivered through a perforated grid 75 at one side of the curved bottom portion of the housing structure 41. Said grid and the curved bottom portion of the housing structure 41 provide a husk receiving compartment 76. Said compartment receives husks from the chute 71 and also from the husking rolls 53 and 54, said husks being directed by the wall 42 and a wall 77 extending between the end of the wall 69 and the lower end of the wall 72'.

As best shown in Figure 2, a sleeve 78 having a flange 79 at one end is attached to the inside of the end wall 67, projecting a substantial distance therefrom. Said sleeve provides a journal for a shaft 80, which supports and carries an open-end auger structure 81, arranged in a husk compartment 76 concentrically with respect to the curved bottom portion of the housing structure 41. The auger structure extends from adjacent the end wall 67, terminating at the open end 82 of the husk compartment 76. The flights on the auger and the direction of rotation in which it is driven advances a husk and other material to the open end, said material being agitated with the result that grain drops out and falls through the perforated grid 75.

A sleeve 83 connects a shaft 80 with a similar shaft extending in the opposite direction. Power is applied by simple means to said shaft for rotating the auger structure.

An auger conveyor 85 is mounted in the shelled grain saving compartment 74 being journaled at its outer end in a member 85ª which closes the outer end of the compartment. At the inner end, the auger conveyor 85 is connected to a sprocket member 86, the end of the auger being journaled in a bracket 87. The sprocket 86 serves the purpose of driving an elevator conveyor as will be hereinafter described. Said sprocket is carried by a sleeve 88 into which the end of the auger shaft 89 is slidably keyed. By moving the auger conveyor 85 endwise, the sleeve 88 may be removed with the elevator structure.

A blower fan outlet 90 is indicated as being mounted above the husking rolls with a discharge conduit 91 arranged to deliver the blast of air over the husking rolls.

An elevator 92, as shown in Figure 3, is mounted at the rear of the husking unit extending rearwardly and upwardly therefrom, as shown in Figure 1. Said elevator contains a conveyor 93 which is driven by the sprocket 86, previously referred to. The shaft 94, previously referred to as carrying the sprocket 56' and the bevel gear 58, provides the driving power for the auger structures. As indicated in dotted lines in Figure 1, the chain 58' passes around and under a sprocket 95 carried on the shaft 80, thereby driving the auger structure 81. A chain 58' also passes over a sprocket 96, rotatable with a sprocket 97 from which a drive chain 98 is indicated as driving a sprocket 99 arranged to drive the auger conveyor 85. It is to be understood that the specific drive means, utilized for supplying power to the various moving elements of applicants' structure, are parts of the present invention in only so far as it is desirable to indicate generally a means by which the different elements may be operated. Any well known type of gearing or other mechanical means may be provided for operating the moving parts in the proper direction in the desired speed. The operation of applicants' improved husking and grain saving device has been explained in connection with the description of the component parts. Said device is particularly effective in saving a maximum amount of the grain shelled from the ears both by the snapping and husking operations. It has been found that loose husks, passing through the snapping rolls, carry a considerable amount of shelled grain. These husks are often detached from the stalks and are carried out by providing the return chute 71 immediately back of the snapping rolls. Both the free shelled grain and that retained by loose husks is recovered by delivery into the husk receiving chamber and by subsequently agitating these husks and sifting out the free grains. The general construction of the device, as above described, is disclosed in the previously identified copending application. The invention set forth herein resides in the provision of husk and shelled grain return means at the rear of the snapping rolls and between the snapping rolls of the perforated grid.

What is claimed is:

1. A corn harvesting and husking machine having conveyor means for feeding stalks in a horizontal direction, snapping rolls through which said stalks are fed, a snapped-ear receiving compartment below said rolls and between said rolls and said conveyor, a shelled-corn saving grid angled on substantially the same level as the snapping rolls and spaced therefrom in the direction in which the stalks are being moved said stalks being moved horizontally over said grid by the snapping rolls, and a loose husk and shelled-grain receiving chute extending substantially vertically downwardly between the snapping rolls and said grid whereby the stalks are discharged and the loose husks dropped downwardly through said chute.

2. A corn snapping and husking machine having conveyor means for feeding stalks in a horizontal direction, snapping rolls through which said stalks are fed, a snapped-ear receiving compartment below said rolls and between said rolls and said conveyor, a shelled-corn saving grid angled on substantially the same level as the snapping rolls and spaced therefrom in the direction in which the stalks are being moved, a loose husk and shelled-grain receiving chute extending substantially vertically downwardly between the snapping rolls and said grid whereby the stalks are discharged and the loose husks dropped downwardly through said chute, husking rolls provided at the bottom of the ear-receiving compartment, and a husk compartment below the husking rolls, said chute communicating with said husk compartment.

3. A corn snapping and husking machine having conveyor means for feeding severed stalks in a horizontal direction, transverse snapping rolls through which said stalks are fed, a snapped-ear receiving compartment below said rolls and between said rolls and said conveyor, a shelled-corn saving grid angled on substantially the same level as the snapping rolls and spaced therefrom in the direction in which the stalks are being moved, horizontal husking rolls provided at the bottom of the ear-receiving compartment, a husk compartment provided below the husking rolls, a loose husk and shelled-grain receiving chute extending substantially vertically downwardly from between the snapping rolls and said grid whereby the stalks are discharged and the loose husks dropped downwardly through said chute, said chute communicating with the husk compartment, said compartment having a shelled-grain-saving means cooperatively arranged with respect to said compartment, and a husk-discharging means in said compartment.

4. A corn snapping and husking machine having conveyor means for feeding severed stalks in a horizontal direction, transverse snapping rolls through which said stalks are fed, a snapped-ear receiving compartment below said rolls and between said rolls and said conveyor, horizontal husking rolls provided at the bottom of the ear-receiving compartment, a husk compartment provided below the husking rolls, a loose husk and shelled-grain receiving chute extending downwardly at the discharge side of the snapping rolls, said chute communicating with the husk compartment, said compartment having a shelled-grain-saving perforated wall portion, a husk-discharging auger in said compartment and grain-receiving means arranged in cooperative relation with respect to the perforated wall portion thereof.

5. A corn snapping and husking machine having conveyor means for feeding severed stalks in a horizontal direction, transverse snapping rolls through which said stalks are fed, a snapped-ear receiving compartment below said rolls and between said rolls and said conveyor, a shelled-corn saving grid spaced from the snapping rolls in the direction in which the stalks are being moved, horizontal husking rolls provided at the bottom of the ear-receiving compartment, a husk compartment provided below the husking rolls, a husk and shell-grain receiving chute extending downwardly from between the snapping rolls and said grid, said chute communicating with the husk compartment, said compartment having a shelled-grain-saving perforated wall portion, a husk-discharging auger in said compartment and grain-receiving means arranged in cooperative relation with respect to the perforated wall portion thereof.

6. A corn snapping and husking machine having conveyor means for feeding severed stalks in a horizontal direction, transverse snapping rolls through which said stalks are fed, a snapped-ear receiving compartment below said rolls and between said rolls and said conveyor, a shelled-corn saving grid spaced from the snapping rolls in the direction in which the stalks are being moved, horizontal husking rolls provided at the bottom of the ear-receiving compartment, a husk compartment provided below the husking rolls, a husk and shelled-grain receiving chute extending downwardly from between the snapping rolls and said grid, shelled grain delivery means extending downwardly from the grid, said chute and said means communicating with the husk compartment, said compartment having a shelled-grain-saving perforated wall portion, a husk-discharging auger in said compartment and grain-receiving means arranged in cooperative relation with respect to the perforated wall portion thereof.

ROBERT P. MESSENGER.
ARNOLD E. W. JOHNSON.

REFERENCES CITED

The following references are of record in the file of this patent:

UNITED STATES PATENTS

| Number | Name | Date |
|---|---|---|
| 619,231 | Rupp | Feb. 7, 1899 |
| 717,220 | Kolling et al. | Dec. 30, 1902 |
| 784,907 | Welsh | Mar. 14, 1905 |
| 1,386,207 | Sissel | Aug. 2, 1921 |
| 1,580,351 | VanNortwick | Apr. 13, 1926 |
| 1,628,461 | Grossman | May 10, 1927 |